US005126702A

United States Patent [19]

Gris

[11] Patent Number: 5,126,702

[45] Date of Patent: Jun. 30, 1992

[54] CURRENT SUPPLY MEANS FOR WIDEBAND DISTRIBUTION

[75] Inventor: Joël Gris, Louviers, France

[73] Assignee: U.S. Philips Corporation, New York, N.Y.

[21] Appl. No.: 622,920

[22] Filed: Dec. 6, 1990

[30] Foreign Application Priority Data

Dec. 29, 1989 [FR] France ................................ 89 17451

[51] Int. Cl.⁵ ................................................ H04B 3/00

[52] U.S. Cl. .................................. 333/24 R; 333/132; 333/134; 455/6.1

[58] Field of Search ........ 333/100, 109, 112, 117–119, 333/24 R, 245, 132, 134, 167; 455/3, 6, 14

[56] References Cited

U.S. PATENT DOCUMENTS 3,146,409 8/1964 Lalmond ........................ 333/100 X 4,024,479 5/1977 de Vries ...................... 333/24 R X

*Primary Examiner*—Paul Gensler

*Attorney, Agent, or Firm*—Edward W. Goodman

[57] ABSTRACT

An arrangement for supplying current to a wideband transmission cable includes an all-pass circuit having a high-pass path (VPH) and a low-pass path (VPB) in which the signals in the transmission cable are recombined by virtue of the presence of a phase inverter. A current supply supplies current to the transmission cable via a supply point situated in the low-pass path.

9 Claims, 3 Drawing Sheets

CURRENT SUPPLY MEANS FOR WIDEBAND DISTRIBUTION

The invention relates to a means for supplying a current at a supply point in a section of an ultra-wideband transmission cable.

FIELD OF THE INVENTION

Such a supply means is particularly used in community antenna teledistribution. If a large number of premises, and hence subscribers, is to be connected, the transmitted signals must be processed, for example, amplified, and a supply current must then be provided, preferably utilizing the same cable as for the high-frequency signals.

BACKGROUND OF THE INVENTION

For signals in the range between 40 and 860 MHz there are current supply means which do not perturb the RF signals.

However, the known means are not satisfactory in the ultra-wide band which ranges between 10 and 1750 MHz and is more and more frequently used.

The invention has for its object to overcome this drawback.

SUMMARY OF THE INVENTION

According to the invention, a current supply means as described in the opening paragraph is characterized in that said cable section comprises an all-pass circuit having at least a high-pass path which is provided with a capacitor and a low-pass path which is provided with an inductance, said paths being arranged in parallel and one of said paths including a phase inverter, and in that said supply point is situated in said low-pass path.

Thus, the signals through the high-pass path are not perturbed by the current supply means connected to the low-pass path. Moreover, the all-pass circuit is operated in such a way that all the signals are transmitted and recombined without any phase shift because the phase inverter is provided, which has the additional advantage that there is no gap in the transmitted frequency range, as would be the case if there were two filters. The proposed all-pass circuit is remarkably simple.

As the current supply means comprises a ferrite inductance, it is advantageous that said lowpass path inductance is constituted by two inductances arranged at both sides of the supply point in such a manner that said ferrite inductance does not perturb the RF currents of the transmission cable.

Embodiments of the invention will now be described in greater detail, by way of example, with reference to the accompanying drawings.

DETAILED DESCRIPTION OF PREFERRED EMBODIMENTS OF THE INVENTION

Figure 1:
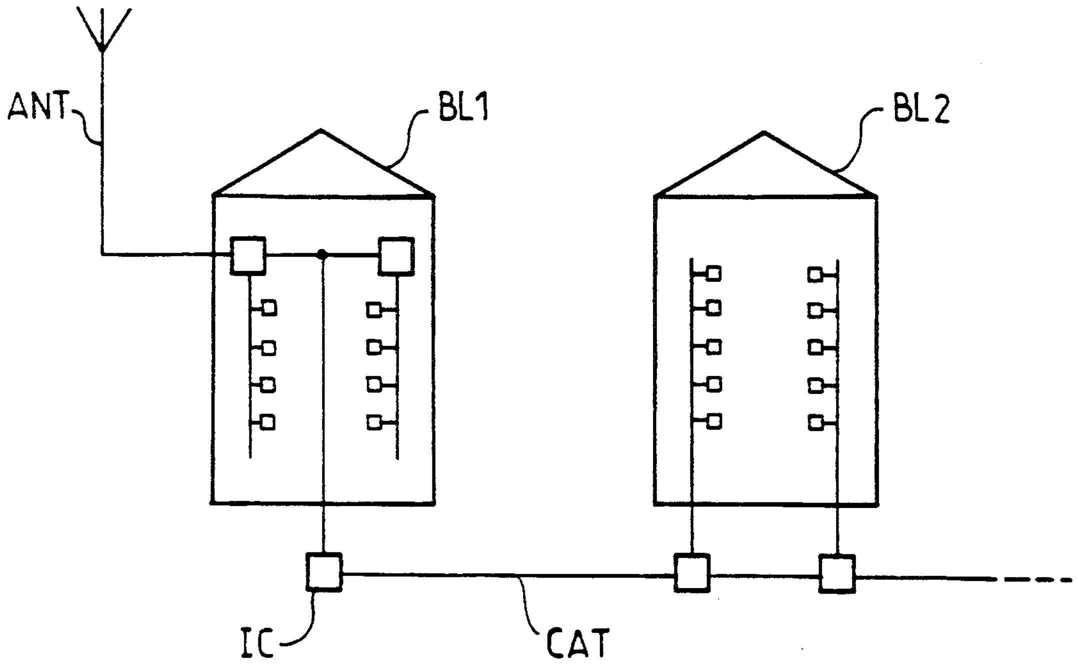
FIG. 1 shows diagrammatically a teledistribution network in a group of premises.

In FIG. 1 an antenna (ANT) sends signals to a distribution network in at least two premises (BL1,BL2). The network has a transmission cable (CAT) and the various modules of the network receive a current from a current supply means (IC) arranged in a section of the cable (CAT).

Figure 2:
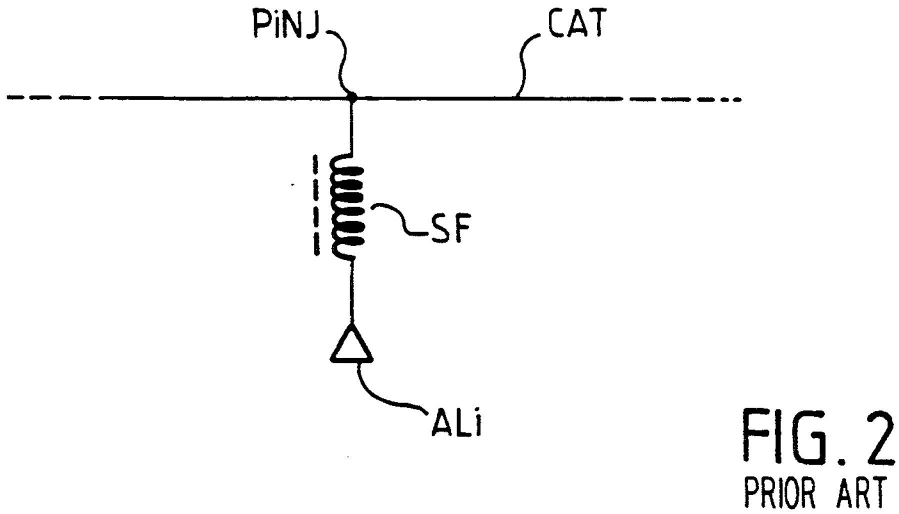
FIG. 2 PRIOR ART
FIG. 2 shows a known current supply means.

FIG. 2 shows a known current supply means (ALI) in the cable (CAT) at a supply point (PINJ) via a ferrite inductance (SF).

The ferrite inductance (SF) is generally adapted to the lowest frequencies and consequently produces parasitic couplings when the range of frequencies transmitted through the cable extends to high values.

Figure 3:
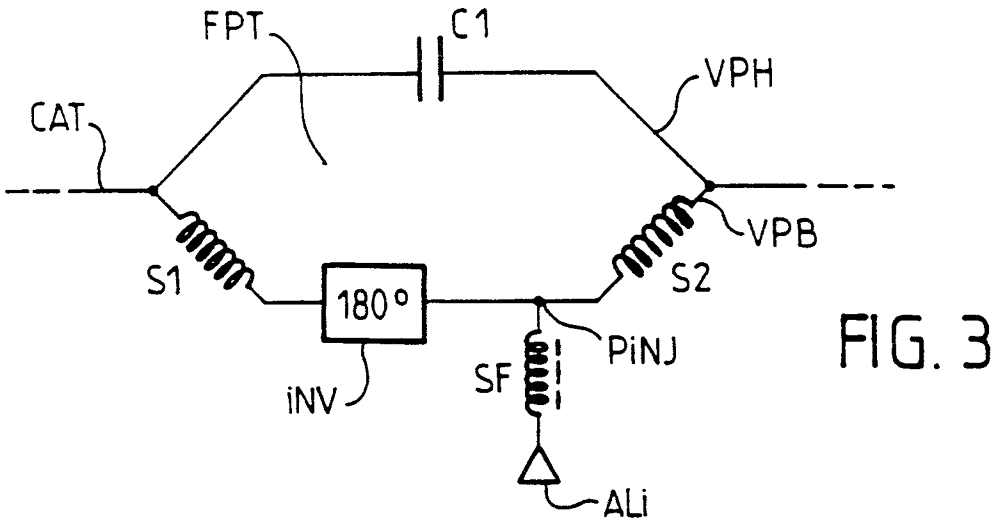
FIGS. 3, 4, 5 show a supply means according to the invention.

FIG. 3 shows a supply means according to the invention.

The cable (CAT) comprises an all-pass circuit having two parallel paths. The high-pass path (VPH) is provided with a capacitor (C1). The low-pass path (VPB) is provided with two inductances (S1,S2) and a phase inverter (INV).

The supply point (PINJ) is situated in the low-pass path between the two inductances.

To separate the paths, a single inductance would be sufficient, but two inductances are preferred so as to obtain symmetry of operation.

The presence of the inverter provides the possibility of recombining the signals in each path without distortion. Likewise, the presence of the two inductances (S1.S2) prevents parasitic couplings of the high-frequency signals with the ferrite inductance (SF).

Figure 4:
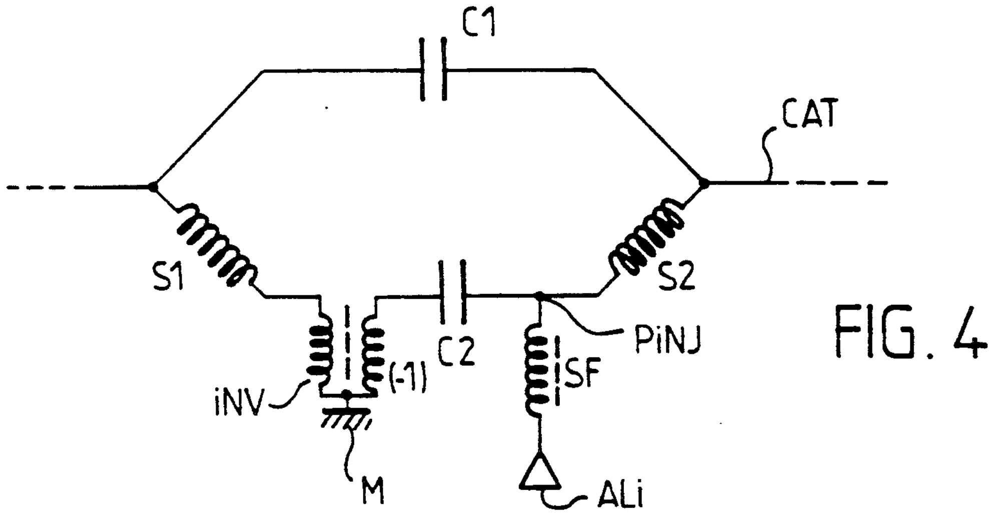

The supply means shown in FIG. 4 is similar to that in FIG. 3. The phase inverter is a transformer having a ratio of (−1) and being connected to ground (M). It is therefore necessary to arrange a capacitor (C2) between the phase inverter (INV) and the current supply point (PINJ). The value of C1 is of course much lower than that of C2. It is to be noted that in this embodiment the current is supplied via S2 only, i.e. in a single part of the cable (CAT).

Figure 5:
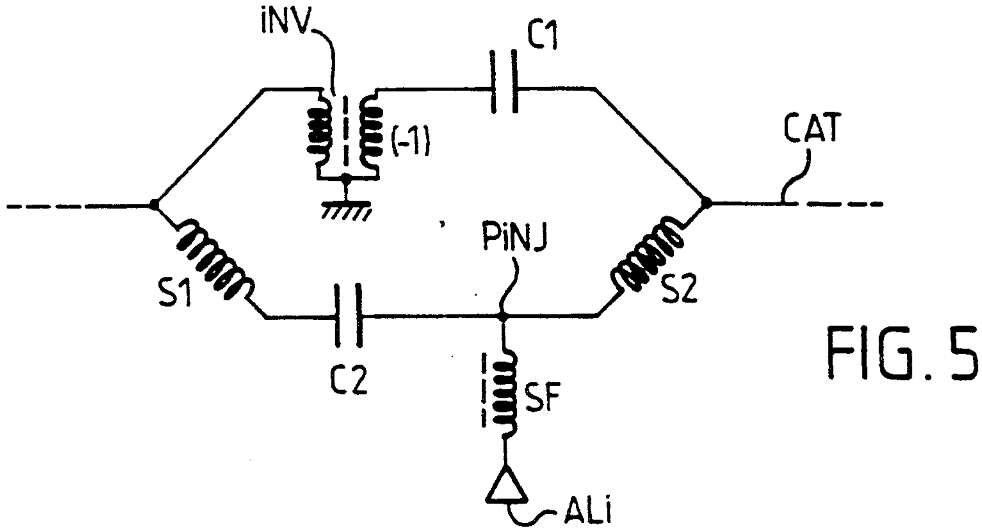

FIG. 5 is similar to FIG. 4, except for the fact that the inverter (INV) is arranged in the high-pass path, but this is unimportant for the operation of the all-pass circuit.

Figure 6:
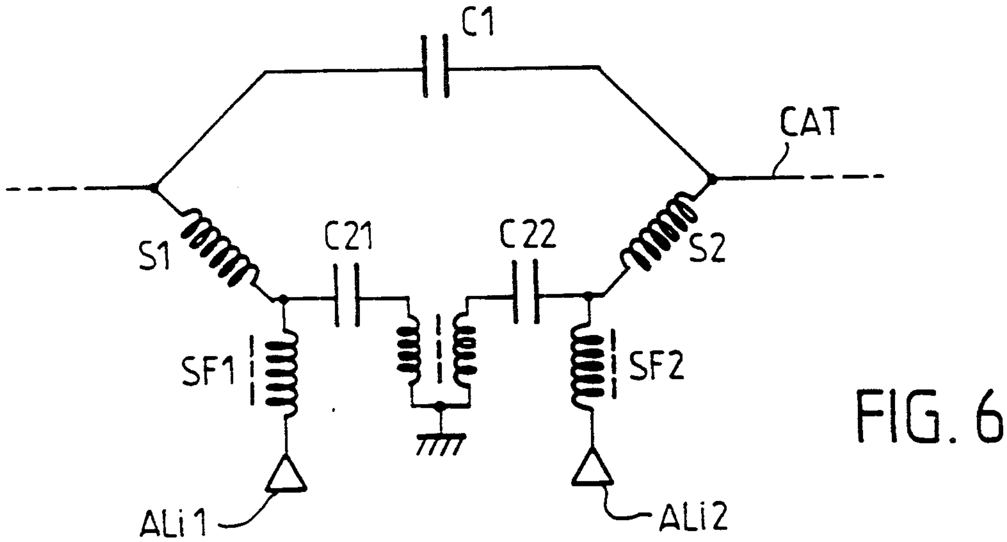
FIGS. 6, 7 show a bidirectional supply means according to the invention.

FIG. 6 shows a bidirectional supply means in the cable CAT. The low-pass path is perfectly symmetrical around the phase inverter, each side being similar to the circuit shown in FIG. 4. The two supply terminals (ALI1,ALI2) can be connected to a single supply module.

Figure 7:
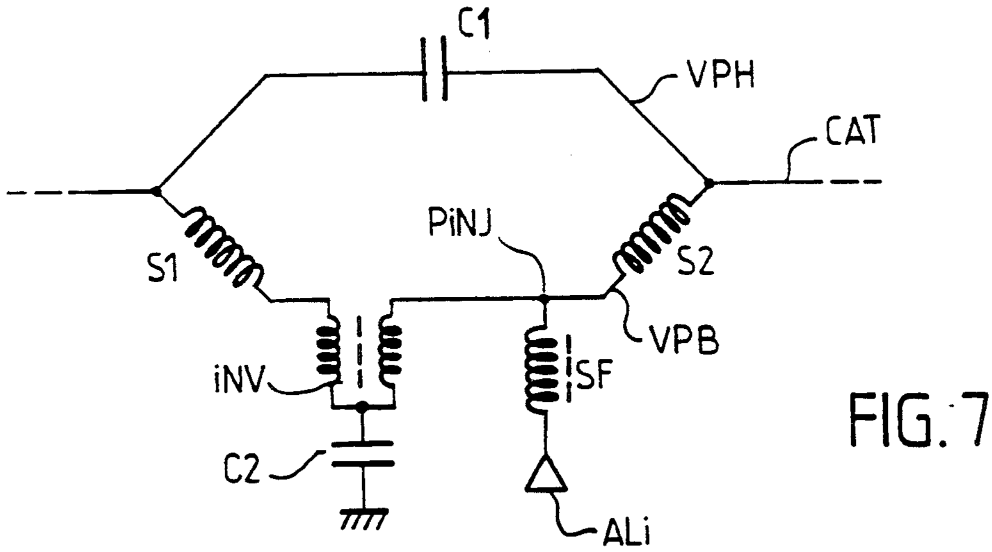

The supply means shown in FIG. 7 is also bidirectional, but it is more economical because the capacitor C2 is now connected between the phase inverter (INV) and ground. It will be clear that an economy of components is thus realized in the circuit.

I claim:

1. An arrangement for supplying current to an ultra-wideband transmission cable carrying an RF signal, said arrangement comprising:
   - an all-pass circuit having at least a high-pass path provided with a capacitor and a low-pass path provided with inductance means, said paths being arranged in parallel and one of said paths including a phase inverter, and said low-pass path including a supply point; and
   - current supply means coupled to said supply point for supplying current to said ultra-wideband transmission cable separate from a source of said RF signal.

2. An arrangement for supplying current to an ultra-wideband transmission cable as claimed in claim 1 wherein said current supply means includes a ferrite inductance coupled to said supply point, characterized in that said inductance means in said low-pass path comprises two inductances arranged on opposite sides of said supply point such that said ferrite inductance does not perturb RF-current in said transmission cable.

3. An arrangement for supplying current to an ultra-wideband transmission cable as claimed in claim 2, characterized in that said two inductances have the same value so as to obtain symmetry of operation.

4. An arrangement for supplying current to an ultra-wideband transmission cable, said arrangement comprising:

an all-pass circuit having at least a high-pass path provided with a capacitor and a low-pass path provided with an inductance, said paths being arranged in parallel and one of said paths including a phase inverter, and said low-pass path including a supply point; and current supply means coupled to said supply point, wherein said phase inverter is arranged in said low-pass path and is a coil transformer connected to ground, and said low-pass path further comprises a capacitor arranged between said phase inverter and said supply point.

5. An arrangement for supplying current to an ultra-wideband transmission cable, said arrangement comprising:

an all-pass circuit having at least a high-pass path provided with a capacitor and a low-pass path provided with an inductance, said paths being arranged in parallel and one of said paths including a phase inverter, and said low-pass path including a supply point; and current supply means coupled to said supply point, wherein said phase inverter comprises a coil transformer connected to ground via a capacitor.

6. An arrangement for supplying current to an ultra-wideband transmission cable, said arrangement comprising:

an all-pass circuit having at least a high-pass path provided with a capacitor and a low-pass path provided with inductance means, said paths being arranged in parallel and one of said paths including a phase inverter, and said low-pass path including a supply point; and current supply means including a ferrite inductance coupled to said supply point, in which said inductance means in said low-pass path comprises two inductances arranged on opposite sides of said supply point such that said ferrite inductance does not perturb RF-current in said transmission cable, wherein said phase inverter is arranged in said low-pass path and is a coil transformer connected to ground, and said low-pass path further comprises a capacitor arranged between said phase inverter and said supply point.

7. An arrangement for supplying current to an ultra-wideband transmission cable. said arrangement comprising:

an all-pass circuit having at least a high-pass path provided with a capacitor and a low-pass path provided with inductance means, said paths being arranged in parallel and one of said paths including a phase inverter, and said low-pass path including a supply point; and current supply means including a ferrite inductance coupled to said supply point, in which said inductance means in said low-pass path comprises two inductances arranged on opposite sides of said supply point such that said ferrite inductance does not perturb RF-current in said transmission cable, wherein said phase inverter comprises a coil transformer connected to ground via a capacitor.

8. An arrangement for supplying current to an ultra-wideband transmission cable, said arrangement comprising:

an all-pass circuit having at least a high-pass path provided with a capacitor and a low-pass path provided with inductance means, said paths being arranged in parallel and one of said paths including a phase inverter, and said low-pass path including a supply point; and current supply means including a ferrite inductance coupled to said supply point, in which said inductance means in said low-pass path comprises two inductances having the same value arranged on opposite sides of said supply point such that symmetry of operation is obtained and said ferrite inductance does not perturb RF-current in said transmission cable, wherein said phase inverter is arranged in said low-pass path and is a coil transformer connected to ground, and said low-pass path further comprises a capacitor arranged between said phase inverter and said supply point.

9. An arrangement for supplying current to an ultra-wideband transmission cable, said arrangement comprising:

an all-pass circuit having at least a high-pass path provided with a capacitor and a low-pass path provided with inductance means, said paths being arranged in parallel and one of said paths including a phase inverter, and said low-pass path including a supply point; and current supply means including a ferrite inductance coupled to said supply point, in which said inductance means in said low-pass path comprises two inductances having the same value arranged on opposite sides of said supply point such that symmetry of operation is obtained and said ferrite inductance does not perturb RF-current in said transmission cable, wherein said phase inverter comprises a coil transformer connected to ground via a capacitor.

* * * * *